Oct. 30, 1934.   W. ZIMMERMANN   1,978,559
PROCESS OF MAKING PRINTING SURFACES

Filed May 4, 1933

INVENTOR
William Zimmermann
BY Warren S. Orton
ATTORNEY

Patented Oct. 30, 1934

1,978,559

UNITED STATES PATENT OFFICE 1,978,559

PROCESS OF MAKING PRINTING SURFACES

William Zimmermann, Glendale, N. Y.

Application May 4, 1933, Serial No. 669,326

10 Claims. (Cl. 95—5)

This invention relates to improvement in the art of making printing surfaces by photography or for making photographic plates or films bearing patterns which are, in turn, transferred upon printing surfaces, and it relates specifically to means for ruling certain areas or "grounds" with a single line screen effect in such manner that in the pattern the screen will not cross the boundary lines of figures, as, for example, leaves or petals of flowers, but will lie within said boundary lines or outlines. The result is that the outlines of the pattern are kept sharp in every detail, whereas, if the screen lines cross the pattern figure boundaries, the latter would be sawtooth in effect with surfaces lacking sharpness in the printing.

The invention will be described with reference to the accompanying drawing, in which Fig. 1 is a plan view illustrating a positive photographic plate of the pattern.

Figure 1:
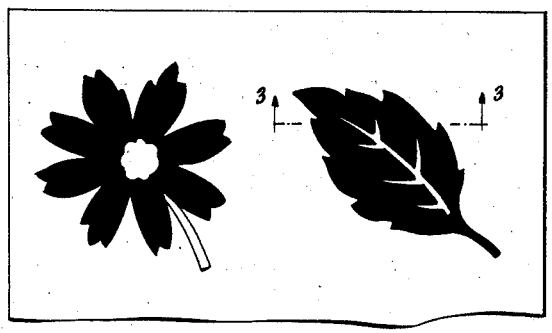
Figure 2:
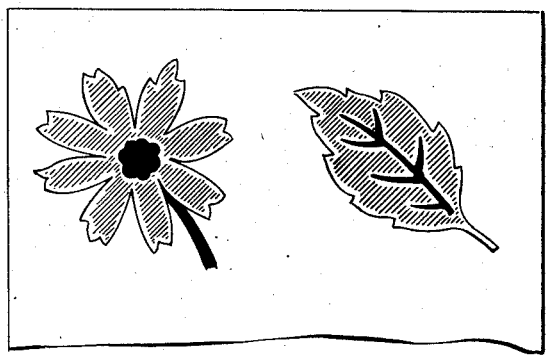
Fig. 2 is a plan view of the printing surface desired to be produced from said positive.

In practicing my method of obtaining a single line screen within desired figures of the pattern, or as a ground, and at the same time maintain the line screen a pre-determined distance within the outline of the pattern figures or beyond the boundary of the figures when the screen is used as a background, I photograph the original copy according to the dry plate or wet plate method, whichever appears to be more suitable at the time according to regular photographic practice, and make a contact positive from the original negative. For purposes of illustration, I have shown such a positive in Fig. 1, the pattern for the purposes of simplicity, being a simple group of leaf and flower forms.

The second step following production of the positive, is to diffuse a second negative from the positive by placing the two members out of contact either by means of glass or one or more layers of transparent sheets such as celluloid, the spacing being that required by the degree of diffusion desired, the thicker the medium used between the positive and the sensitized negative sheet, the greater the distance between the boundary line of the figures and the line screen in the finished work.

Figure 3:
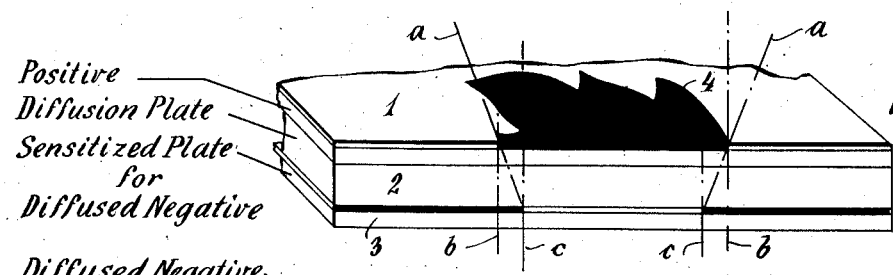
Fig. 3 is an enlarged perspective view of a portion of the positive plate shown in Fig. 1 (cut on the line 3—3), the latter having applied thereto a diffusion plate and a diffused negative.

In Fig. 3, I have shown the positive at 1, a diffusing plate at 2 and diffused negative at 3. It will be noted that the device 4 of the pattern, in this case the fragment of a leaf, has been so spaced from the negative plate 3, that the light rays indicated at $a$ have passed under the device 4, which normally would bar or shield the light so that its printing area has been reduced from the normal lines $bb$ to the more restricted lines $cc$. It will thus be seen that the image of each dark area on the positive will be reduced in area on the diffused negative.

Figure 4:
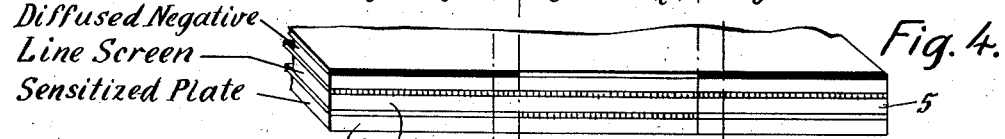
Fig. 4 is a view in edge elevation of the diffused negative in contact with a line screen and a sensitized film or plate.
Figure 5:
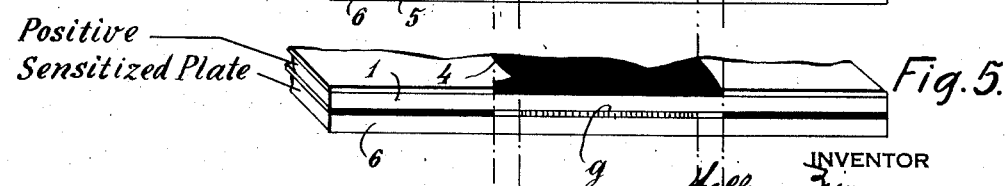
Fig. 5 is a view similar to Fig. 4 showing the positive plate applied to the sensitized film after the latter has received an exposure from the diffused negative and line screen.

After the diffused negative has been produced by the method above described, it is placed with a line screen in register with a sensitized plate or film. In Fig. 4 the line screen is indicated at 5 and the sensitized plate or film at 6. The light rays will pass through the pattern areas of the diffused negative and will pass to the sensitized film via the line screen so that in the sensitized film the restricted areas of the diffused negative will be ruled by the screen.

The third and final light exposure of the process is to obtain a second exposure of the sensitized film or plate by means of the positive 1. Referring to the lines $c$ and $b$, it will be seen that screen lines have been produced on the sensitized film within the boundary of the lines $c$ and the second exposure from the positive plate 1 will reproduce the device 4 in its full area upon the sensitized film surrounding the screen $g$ and the margins of the device 4 will lie beyond the screen a pre-determined and uniform distance at all points.

The figures in the drawing are for purposes of illustration only and intended to show in a simple and schematic manner, the operation of the process when it is desired to fill in certain areas of the design with a line screen, the method to be the same, however, when other than ruled effects are desired, as, for example, the ground or the figures are to compose dots or minute elements of any desired form.

It will be understood that in the application of the method, the sensitized member 6 may be a metallic printing member having a sensitized surface which when developed is transformed by the usual etching methods into a printing surface.

Having described my invention, what I claim and desire to secure by Letters Patent, is as follows:—

1. In the art of making printing surfaces comprising designs, a process which consists in producing a transparent reproduction of the design, diffusing a photographic negative of reduced size from the transparent reproduction by placing the reproduction and negative material a distance apart and subjecting the same to light, developing the negative material, then exposing a sensitized sheet in register with the diffused negative and a screen, removing the diffused negative and screen, and making a second exposure of the sensitized sheet through the transparent reproduction in substantially unreduced form overlying the first exposure.

2. In the art of making printing surfaces comprising designs, a process which consists in producing a positive reproduction of the design, producing a reduced size diffused photographic negative of the positive by placing the positive and the negative material a distance apart and subjecting the same to light, then exposing a sensitized medium in register with the diffused negative material and a screen, removing the diffused negative and screen, and making a second exposure of the sensitized medium through the positive in substantially unreduced form over the first exposure.

3. In the art of making printing surfaces comprising designs, a process of photographically producing a ground for the design but spaced from the outlines of the latter which consists in producing a transparent reproduction of the design, diffusing a reduced size image of the transparent reproduction by placing the reproduction and a sensitive medium a distance apart and subjecting the same to light, then exposing a second sensitized medium in register with the first-named medium and a screen bearing the configuration employed for the ground, removing the first-named medium and screen and making a second exposure of the second sensitized medium through the transparent reproduction in substantially unreduced form overlying the first exposure.

4. In the art of making printing surfaces comprising designs, a process which consists in producing a reproduction of the design, exposing a sensitized body or member in register with the reproduction of design in such manner that the design is exposed upon the body or member in reduced form, photographically reproducing said reduced design, in said reduced form upon a sensitized body or member with an interposed screen, and subjecting said body or member to printing from the first-named body or member in substantially unreduced form overlying said reduced design and without a screen.

5. In the art of making printing surfaces comprising designs, a process which consists in producing a reduced size negative of the design, printing said reduced design negative without substantial change of size upon a sensitized body or member with an interposed screen, and printing said sensitized body or member with the original design in unreduced form overlying the first printing.

6. In the art of making printing surfaces comprising designs, a process which consists in producing a reproduction of the design in reduced form, exposing a sensitized medium in register with the reduced reproduction and a screen, then removing the reduced reproduction and screen and photographically reproducing upon said sensitized medium the original design in full form in superposition with said reduced design.

7. In the art of making printing surfaces comprising designs, a process which consists in producing a transparent reproduction of the design, diffusing a photographic negative of reduced size from the transparent reproduction, developing the negative material, then exposing a sensitized sheet in register with the diffused negative and a screen, removing the diffused negative and screen, and making a second exposure of the sensitized sheet through the transparent reproduction in substantially unreduced form overlying the first exposure.

8. In the art of making printing surfaces comprising designs, a process which consists in producing a positive reproduction of the design, producing a reduced size diffused photographic negative of the positive, then exposing a sensitized medium in register with the diffused negative and a screen, removing the diffused negative and screen, and making a second exposure of the sensitized medium through the positive in substantially unreduced form over the first exposure.

9. In the art of making printing surfaces comprising designs, a process of photographically producing a ground for the design but spaced from the outlines of the latter which consists in producing a transparent reproduction of the design, diffusing a reduced size negative of the transparent reproduction, then exposing a second sensitized medium in register with the negative and a screen bearing the configuration employed for the ground, removing the negative and screen and making a second exposure of the second sensitized medium through the transparent reproduction in substantially unreduced form overlying the first exposure.

10. The process which consists in subjecting a sensitized body to two exposures, first with a screen and a diffused negative having a transparent area forming a design and then subjecting the partly exposed body to an exposure through a positive of said negative in which the design is of slightly larger size than the design of the transparent area forming design, the design on said positive being arranged in superposed relation relative to the screen design on the partly exposed body to entirely cover the screen design and project beyond the outline thereof.

WILLIAM ZIMMERMANN.